United States Patent
Edke et al.

(10) Patent No.: US 11,933,428 B2
(45) Date of Patent: Mar. 19, 2024

(54) BALL VALVE ASSEMBLY

(71) Applicant: ONESUBSEA IP UK LIMITED, London (GB)

(72) Inventors: Mangesh Edke, Sugar Land, TX (US); Mahesh Shenoy, Katy, TX (US); John Kobersky, Alvin, TX (US); Malcolm Atkinson, Aberdeen (GB); Adam Tusing, Houston, TX (US)

(73) Assignee: OneSubsea IP UK Limited, London (GB)

( * ) Notice: Subject to any disclaimer, the term of this patent is extended or adjusted under 35 U.S.C. 154(b) by 211 days.

(21) Appl. No.: 17/596,582

(22) PCT Filed: Jun. 24, 2020

(86) PCT No.: PCT/US2020/039332
§ 371 (c)(1),
(2) Date: Dec. 14, 2021

(87) PCT Pub. No.: WO2020/263957
PCT Pub. Date: Dec. 30, 2020

(65) Prior Publication Data
US 2022/0316606 A1    Oct. 6, 2022

Related U.S. Application Data

(60) Provisional application No. 62/866,012, filed on Jun. 25, 2019, provisional application No. 62/865,432, (Continued)

(51) Int. Cl.
*F16K 5/06* (2006.01)
*F16K 27/06* (2006.01)
(Continued)

(52) U.S. Cl.
CPC .......... *F16K 5/0647* (2013.01); *F16K 27/067* (2013.01); *F16K 31/5284* (2013.01); *E21B 34/14* (2013.01); *E21B 2200/04* (2020.05)

(58) Field of Classification Search
CPC .. F16K 5/0647; F16K 27/067; F16K 31/5284; E21B 34/14; E21B 2200/04
See application file for complete search history.

(56) References Cited

U.S. PATENT DOCUMENTS 4,700,924 A * 10/1987 Nelson .................. E21B 21/106
92/136
5,494,256 A 2/1996 Beson
(Continued)

FOREIGN PATENT DOCUMENTS

JP    2001248739 A    9/2001
WO   2010048770 A1   5/2010

OTHER PUBLICATIONS

International Search report and Written Opinion issued in PCT/US2020/039332, dated Sep. 25, 2020 (11 pages).

*Primary Examiner* — Matthew W Jellett
(74) *Attorney, Agent, or Firm* — Jeffrey D. Frantz

(57) ABSTRACT

A ball valve assembly includes a ball configured to rotate between an open position and a closed position. The ball valve assembly also includes a cradle having a ball-facing surface. The ball-facing surface faces the ball and is positioned at an end of a fluid passage through the cradle. In addition, the cradle is configured to rotatably support the ball to enable the ball to rotate between the open position and the closed position, and the cradle is configured to block movement of the ball toward the ball-facing surface to establish a separation distance between the ball and the ball-facing surface.

18 Claims, 8 Drawing Sheets

Related U.S. Application Data filed on Jun. 24, 2019, provisional application No. 62/865,373, filed on Jun. 24, 2019.

(51) Int. Cl.
*F16K 31/528* (2006.01)
*E21B 34/14* (2006.01)

(56) References Cited

U.S. PATENT DOCUMENTS

| | | | |
|---|---|---|---|
| 6,152,229 A * | 11/2000 | Jennings | ............... E21B 29/04 |
| | | | 166/332.3 |
| 8,607,882 B2 | 12/2013 | Kalb et al. | |
| 8,925,894 B2 * | 1/2015 | Natarajan | ............. F16K 5/0647 |
| | | | 251/315.08 |
| 9,657,550 B2 | 5/2017 | Inglis et al. | |
| 10,221,652 B2 | 3/2019 | Inglis et al. | |
| 2006/0017035 A1 | 1/2006 | Bearer et al. | |
| 2010/0117019 A1 | 5/2010 | Hubacek et al. | |
| 2012/0138834 A1 | 6/2012 | Tortel et al. | |
| 2017/0335977 A1 | 11/2017 | Salem et al. | |

* cited by examiner

BALL VALVE ASSEMBLY

REFERENCE TO RELATED APPLICATIONS

This patent application claims the benefit of and incorporates by reference each of the following provisional applications: U.S. Provisional Pat. Appl. No. 62/865,373 filed Jun. 24, 2019; U.S. Provisional Pat. Appl. No. 62/865,432 filed Jun. 24, 2019; and U.S. Provisional Pat. Appl. No. 62/866,012 filed Jun. 25, 2019.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies search for and extract oil, natural gas, and other subterranean resources from the earth. Once a desired subterranean resource is discovered, drilling and production systems are employed to access and extract the resource. These systems may be located onshore or offshore depending on the location of a desired resource. For example, in subsea operations, hydrocarbon fluids such as oil and natural gas are obtained from a subterranean geologic formation, referred to as a reservoir, by drilling a well that penetrates the hydrocarbon-bearing geologic formation. In various subsea applications and other well applications, ball valve assemblies are used to control fluid flow through a well string. Ball valve assemblies include a ball having a fluid pathway extending through the ball. While the ball valve assembly is in an open state (e.g., open position of the ball), the fluid pathway of the ball is aligned with a fluid passage of the ball valve assembly, thereby enabling fluid to flow through the ball valve assembly. In addition, while the ball valve assembly is in a closed state (e.g., closed position of the ball), the fluid pathway of the ball is oriented generally perpendicularly to the fluid passage of the ball valve assembly, thereby blocking fluid flow through the ball valve assembly. In certain ball valve assemblies, the ball is supported by/captured between a seal retainer and a cradle. A seal is coupled to the seal retainer and engaged with the ball, and a bushing is coupled to the cradle and engaged with the ball. While the ball is in the closed position, fluid pressure within the fluid passage (e.g., above-ball fluid pressure) may drive the ball into engagement with the bushing on the cradle. Due to the static friction between the ball and the bushing, the actuator assembly, which is configured to drive the ball to rotate between the open and closed positions, may not provide sufficient force to drive the ball to rotate to the open position. Accordingly, other procedures, such as establishing a significant above-ball fluid pressure within the fluid passage, may be performed to drive the ball to the open position.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
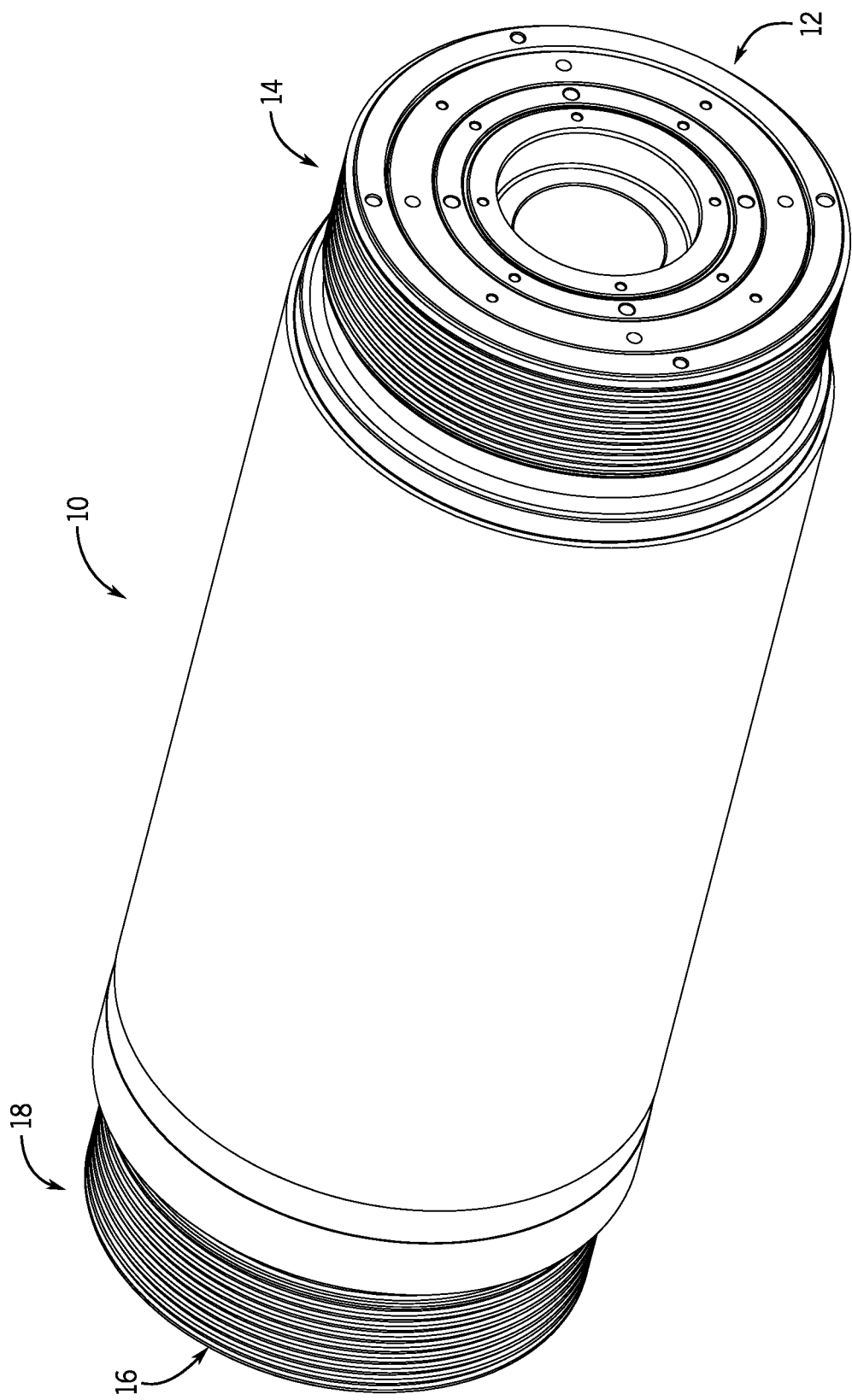
FIG. 1 is a perspective view of an embodiment of a ball valve assembly.

FIG. 1 is a perspective view of an embodiment of a ball valve assembly 10. In certain embodiments, the ball valve assembly 10 may be disposed along a well string, such as a landing string. For example, the ball valve assembly 10 may be used as a retainer valve within a subsea landing string. In the illustrated embodiment, the ball valve assembly 10 includes an inlet 12 positioned at a first end portion 14 of the ball valve assembly 10, and the ball valve assembly 10 includes an outlet 16 positioned at a second end portion 18 of the ball valve assembly 10. The inlet 12 is configured to receive fluid (e.g., from a well), and the ball valve assembly 10 is configured to control flow of the fluid through the ball valve assembly 10 between the inlet 12 and the outlet 16.

The ball valve assembly 10 includes a ball having a fluid pathway extending through the ball. The ball is configured to rotate between an open position and a closed position. The fluid pathway is configured to align with a fluid passage of the ball valve assembly 10 while the ball is in the open position to enable fluid flow through the ball valve assembly 10. In addition, the fluid pathway is configured to be offset from the fluid passage while the ball is in the closed position to block fluid flow through the ball valve assembly 10. Furthermore, the ball valve assembly includes a ball support and actuation assembly configured to support the ball within the ball valve assembly and to drive the ball to rotate between the open position and the closed position. In the illustrated embodiment, the ball support and actuation assembly drives the ball to rotate in response to receiving pressurized hydraulic fluid. Accordingly, the illustrated ball valve assembly 10 includes first hydraulic input(s) and second hydraulic input(s). Applying pressurized hydraulic fluid to the first hydraulic input(s) causes the ball support and actuation assembly to drive the ball to the closed position, and applying pressurized hydraulic fluid to the second hydraulic input(s) causes the ball support and actuation assembly to drive the ball to the open position. If hydraulic fluid flow to the second hydraulic input(s) is interrupted, a compression spring within the ball valve assembly 10 may drive the ball to the closed position. Accordingly, the illustrated ball valve assembly is considered a failsafe closed ball valve assembly. However, in other embodiments, the ball valve assembly may be a failsafe open ball valve assembly, a fail-as-is ball valve assembly, or any other suitable type of ball valve assembly.

Furthermore, in certain embodiments, the ball support and actuation assembly includes a cradle having an arm configured to rotatably support the ball. In addition, the ball has a contact surface and the arm of the cradle has a corresponding contact surface. The ball support and actuation assembly also includes a rotation pin engaged with the arm, in which the ball is configured to rotate about the rotation pin. The contact surface of the ball and the corresponding contact surface of the arm of the cradle are spaced apart from one another while a force urging the ball toward the cradle is less than or equal to a threshold force, and the corresponding contact surface of the arm of the cradle is configured to engage the contact surface of the ball to block movement of the ball toward the cradle while the force is greater than the threshold force. Because the contact surfaces are spaced apart from one another while the force is less than or equal to the threshold force, the torque sufficient to drive the ball to rotate between the open and closed position may be significantly reduced (e.g., as compared to a ball that is captured between contact surfaces on uphole and downhole sides, which establishes significant resistance to rotation). In addition, the contact surfaces block movement of the ball toward the cradle while the force urging the ball toward the cradle is greater than the threshold force, thereby blocking contact between the ball and a ball-facing surface of the cradle, which reduces resistance to rotation of the ball.

Figure 2:
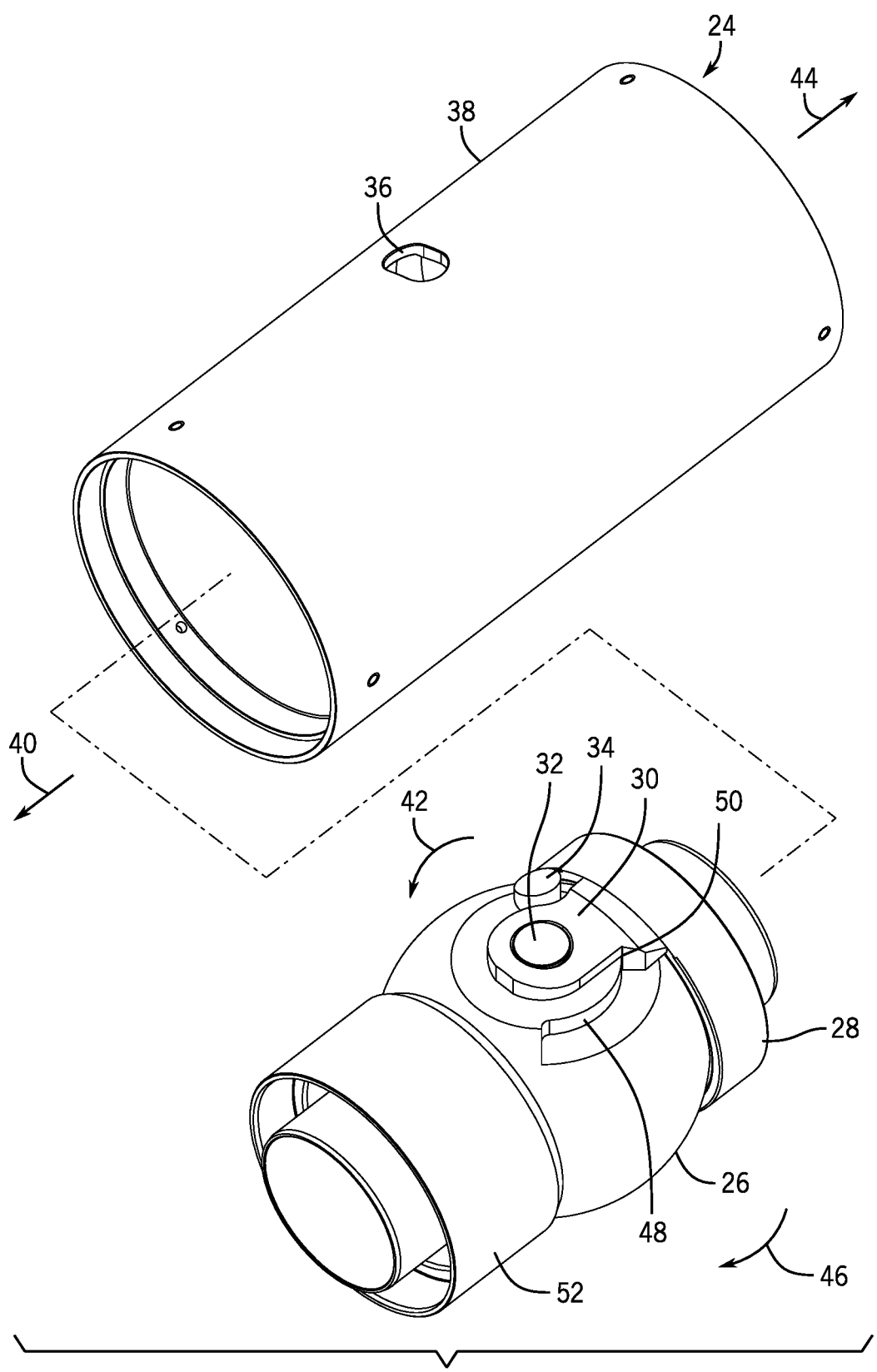
FIG. 2 is an exploded perspective view of an embodiment of a ball support and actuation assembly that may be employed within the ball valve assembly of FIG. 1.

FIG. 2 is an exploded perspective view of an embodiment of a ball support and actuation assembly 24 that may be employed within the ball valve assembly of FIG. 1. In the illustrated embodiment, the ball support and actuation assembly 24 includes a ball 26 configured to rotate between an open position and a closed position. The ball 26 includes a fluid pathway extending through the ball. The fluid pathway is configured to align with a fluid passage of the ball valve assembly while the ball is in the open position to enable fluid flow through the ball valve assembly. In addition, the fluid pathway is configured to be offset from the fluid passage while the ball is in the closed position to block fluid flow through the ball valve assembly. As used herein, "offset" refers to an angle between the fluid pathway and the fluid passage that causes fluid flow through the ball valve assembly to be blocked (e.g., via contact between an outer surface of the ball and respective seal(s)).

The ball support and actuation assembly 24 also includes a cradle 28 configured to rotatably support the ball 26, thereby enabling the ball 26 to rotate between the open position and the closed position. In the illustrated embodiment, the cradle 28 includes arms 30, and a rotation pin 32 is engaged with each arm 30. In certain embodiments, each rotation pin 32 is non-rotatably coupled to the respective arm 30, and each rotation pin 32 is engaged with a respective recess within the ball 26. Accordingly, the ball 26 may rotate about the rotation pins 32 between the open and closed positions. Furthermore, in the illustrated embodiment, actuation pins 34 are coupled to the ball 26 and configured to drive the ball 26 to rotate about the rotation pins 32. Each actuation pin 34 is configured to engage a respective opening 36 (e.g., slot) within an operator 38 of the ball support and actuation assembly 24. Movement of the operator 38 in a first translational direction 40 drives the actuation pins 34 to rotate the ball 26 in a first rotational direction 42 from the illustrated open position to the closed position. In addition, movement of the operator 38 in a second translational direction 44 drives the actuation pins 34 to rotate the ball 26 in a second rotational direction 46 from the closed position to the open position. The openings 36 are shaped to enable lateral movement of the actuation pins 34 as the operator 38 moves in the first and second translational directions. While the actuation pins are fixed to the ball and configured to move within slot-shaped opening in the operator in the illustrated embodiment, in other embodiments, each actuation pin may be coupled to a slider that is disposed within a respective slot in the ball. In such embodiments, translational movement of each actuation pin relative to the operator may be substantially blocked, and the slots in the ball may enable the lateral movement of the actuation pins as the operator moves in the translational directions. However, the friction between the actuation pins and the operator in the illustrated embodiment may be less than the friction between the sliders and the ball in the embodiment disclosed above. Accordingly, the torque sufficient to rotate the ball between the open and closed positions may be less in the illustrated embodiment.

The operator 38 may be driven to move in the translational directions by any suitable device(s), such as one or more hydraulic pistons, one or more pneumatic pistons, one or more electromechanical actuators, other suitable type(s) of actuator(s), or a combination thereof. Furthermore, in certain embodiments, one or more springs (e.g., compression spring(s), coil spring(s), pneumatic spring(s), hydraulic spring(s), electromagnetic spring(s), leaf spring(s), etc.) may urge the operator to move in the first translational direction 40, thereby urging the ball 26 to rotate toward the closed position. The spring(s) may provide sufficient force to drive the ball to the closed position in response to interruption in operation of the device(s) configured to drive the operator to translate. In such embodiments, the ball valve assembly is considered a failsafe closed ball valve assembly.

Furthermore, in the illustrated embodiment, the ball 26 has two contact surfaces 48 (e.g., arcuate contact surfaces), and each arm 30 of the cradle 28 has a corresponding contact surface 50 (e.g., arcuate contact surface). Each contact surface 48 of the ball 26 is spaced apart from a corresponding contact surface 50 of the cradle 28 while a force urging the ball 26 toward the cradle 28 in the second translational direction 44 is less than or equal to a threshold force. For example, the length of the arms and/or the position of the rotation pins along the arms may establish a target spacing between the respective contact surfaces. Furthermore, each corresponding contact surface 50 of the cradle 28 is configured to engage the respective contact surface 48 of the ball 26 to block movement of the ball 26 toward the cradle 28 in the second translational direction 44 while the force is greater than the threshold force. Because the contact surfaces are configured to block movement of the ball toward the cradle while a substantial force is applied to the ball (e.g., by fluid pressure, such as above-ball fluid pressure), the rotation pins 32 may be thinner than rotation pins configured to resist forces above the threshold force, thereby reducing the cost and/or size of the ball valve assembly.

In the illustrated embodiments, a seal retainer 52 is positioned on an opposite side of the ball 26 from the cradle 28. In certain embodiments, the seal retainer 52 is urged toward the ball 26 along the second translational direction 44 by a spring and/or fluid pressure. A seal may be coupled to the seal retainer 52 and engaged with the ball 26 while the ball is in the closed position. Contact between the seal coupled to the seal retainer and the ball blocks fluid flow through the ball valve assembly while the ball is in the closed position.

Figure 3:
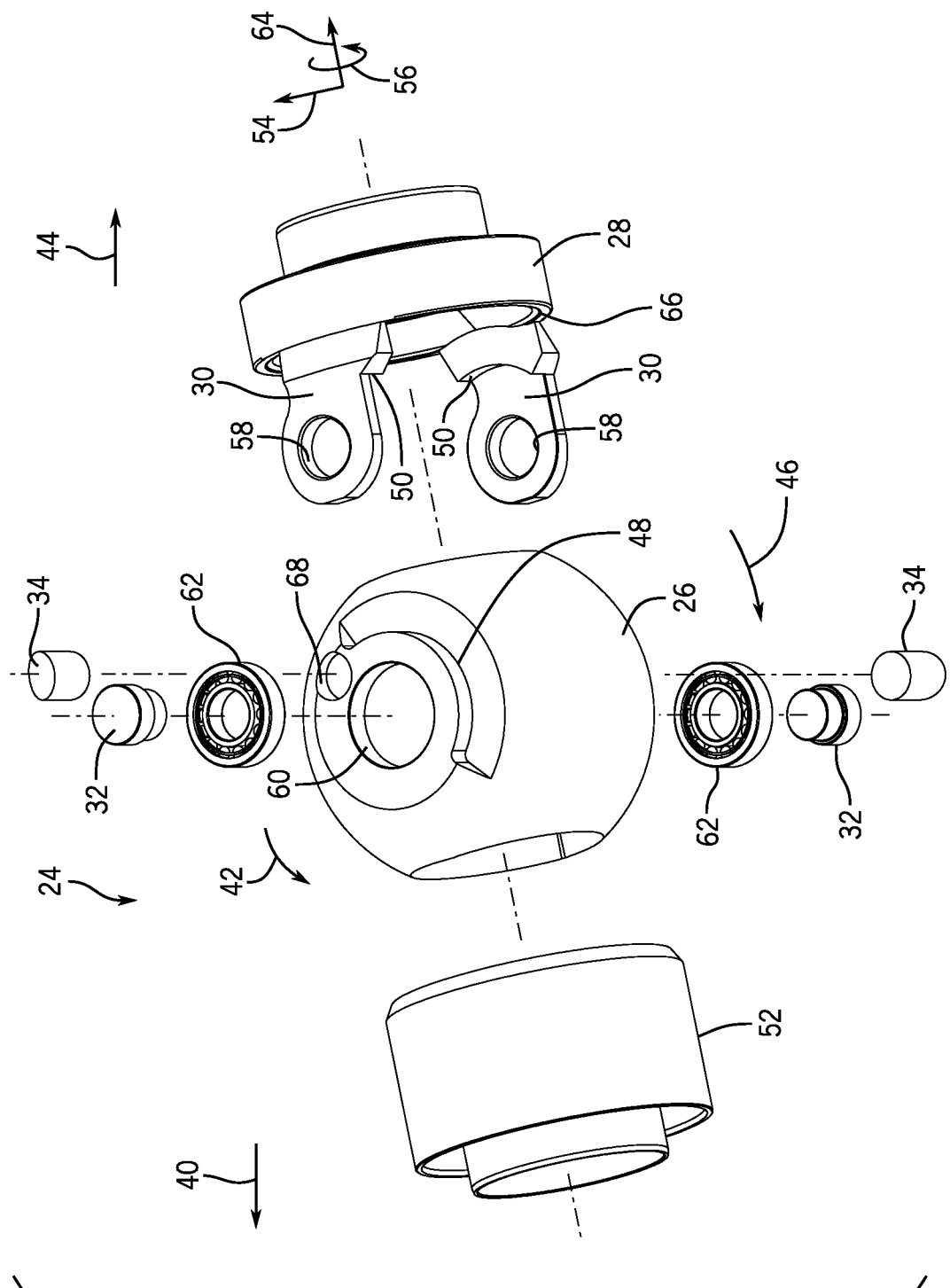
FIG. 3 is an exploded perspective view of a portion of the ball support and actuation assembly of FIG. 2.

FIG. 3 is an exploded perspective view of a portion of the ball support and actuation assembly 24 of FIG. 2. As previously discussed, the cradle 28 has two arms 30 configured to rotatably support the ball 26, thereby enabling the ball 26 to rotate in the first rotational direction 42 from the illustrated open position to the closed position and to rotate in the second rotational direction 46 from the closed position to the open position. In the illustrated embodiment, the two arms 30 are positioned on opposite radial sides of the ball 26 (e.g., opposite sides of the ball along a radial axis 54). Accordingly, the arms 30 (e.g., circumferential center points of the arms 30) are offset from one another by about 180 degrees along a circumferential axis 56. While the cradle 28 includes two arms 30 in the illustrated embodiment, in other embodiments, the cradle may have fewer arms. For example, the cradle may include a single arm positioned on one side of the ball, or the cradle may not include any arms and a body of the cradle may rotatably support the ball within the ball valve assembly.

In the illustrated embodiment, each arm 30 includes a respective opening 58, and each opening 58 is configured to receive a respective rotation pin 32. In the illustrated embodiment, each rotation pin 32 is non-rotatably coupled to the respective arm 30 (e.g., via a press-fit connection, via a threaded connection, via a pinned connection, via a welded connection, via an adhesive connection, via another suitable connection, or a combination thereof). Accordingly, the rotation pins 32 provide a pivot point for the ball 26 to rotate between the open position and the closed position. In the illustrated embodiment, the ball 26 has recesses 60 configured to receive the respective rotation pins 32. While each opening 58 and each recess 60 are substantially circular in the illustrated embodiment, in other embodiments, at least one opening and/or at least one recess may have another suitable shape (e.g., elliptical, polygonal, etc.). Furthermore, while each rotation pin is disposed within a respective opening of the cradle in the illustrated embodiment, in other embodiments, at least one pin may be integrally formed with the cradle (e.g., an arm of the cradle).

In addition, the ball support and actuation assembly 24 includes bearings 62 disposed about the respective rotation pins 32 within the respective recesses 60. The bearings 62 are configured to reduce rotational resistance, thereby facilitating rotation of the ball 26 between the open and closed positions. In the illustrated embodiment, each bearing 62 is a ball bearing including an outer race non-rotatably coupled to the ball 26 (e.g., via a press-fit connection, via a threaded connection, via a pinned connection, via a welded connection, via an adhesive connection, via another suitable connection, or a combination thereof). In addition, each bearing 62 includes an inner race non-rotatably coupled to the respective rotational pin 32 (e.g., via a press-fit connection, via a threaded connection, via a pinned connection, via a welded connection, via an adhesive connection, via another suitable connection, or a combination thereof). Each bearing 62 also includes balls disposed between the races to facilitate rotation of the outer race/ball relative to the inner race/rotation pin. While ball bearings are employed within the illustrated embodiment, in other embodiments, other suitable bearing(s) and/or bushing(s) may be disposed within at least one recess to facilitate rotation of the ball relative to the cradle. For example, while a single bearing is disposed within each recess in the illustrated embodiment, in other embodiments, multiple bearings and/or one or more bushings (e.g., alone, in combination with a single bearing, or in combination with multiple bearings) may be disposed within at least one recess. Furthermore, in certain embodiments, no bearings and no bushings may be disposed within at least one recess. In such embodiments, a lubricant may be disposed within the recess(es) to facilitate rotation of the ball relative to the cradle. A lubricant may also be employed within the embodiments having one or more bearings (e.g., within the bearing(s)) and/or one or more bushings (e.g., on an inner surface of each bushing and/or on an outer surface of each bushing).

While the ball support and actuation assembly 24 includes rotation pins non-rotatably coupled to the cradle 28 in the illustrated embodiment, in other embodiments, at least one rotation pin may be non-rotatably coupled to the ball, and/or at least one rotation pin may be rotatably coupled to the ball and rotatably coupled to the cradle. For example, in certain embodiments, at least one rotation pin may be non-rotatably coupled to the ball (e.g., the rotation pin may be integrally formed with the ball or coupled to the ball by a suitable connection system). In such embodiments, the rotation pin may be rotatably coupled to the cradle. For example, one or more bearings and/or one or more bushings may be disposed about the rotation pin within the respective opening of the cradle, thereby enabling the rotation pin and the ball to rotate relative to the cradle. Furthermore, in certain embodiments, at least one rotation pin may be rotatably coupled to the ball and rotatably coupled to the cradle. For example, one or more bearings and/or one or more bushings may be disposed about the rotation pin within the respective opening of the cradle, and/or one or more bearings and/or one or more bushings may be disposed about the rotation pin within the respective recess of the ball. In addition, while the ball support and actuation assembly 24 includes two rotation pins 32 in the illustrated embodiment, in other embodiments, the ball support and actuation assembly may include a single rotation pin (e.g., in embodiments in which the cradle has a single arm).

As previously discussed, each contact surface 48 of the ball 26 is spaced apart from a corresponding contact surface 50 of the cradle 28 while a force urging the ball 26 toward the cradle 28 in the second translational direction 44 is less than or equal to a threshold force. The force urging the ball 26 toward the cradle 28 may be caused by fluid pressure (e.g., above-ball fluid pressure) acting on the ball 26 while the ball is in the closed position. While the force urging the ball 26 toward the cradle 28 is less than or equal to the threshold force, the rotation pins 32 substantially maintain the position of the ball 26 along a longitudinal axis 64 relative to a ball-facing surface 66 of the cradle 28 (e.g., which surrounds a port of the cradle). Accordingly, a separation distance between the ball 26 and the ball-facing surface 66 may be maintained while the force urging the ball 26 toward the cradle 28 is less than or equal to the threshold force. As a result, the rotational resistance of the ball may be significantly less than the rotational resistance of a ball that is in contact with the ball-facing surface (e.g., bearing surface). Accordingly, a smaller and/or less expensive actuator(s) may be used to drive the ball between the open and closed positions. In addition, the separation distance may enable dirt and/or debris to pass through the ball valve assembly (e.g., as compared to becoming trapped between the ball and the ball-facing surface).

Furthermore, each contact surface 50 of the cradle 28 is configured to engage the respective contact surface 48 of the ball 26 to block movement of the ball 26 toward the cradle 28 along the longitudinal axis 64 while the force urging the ball toward the cradle is greater than the threshold force. For example, while a force greater than the threshold force is applied to the ball in the second translational direction (e.g., by the above-ball fluid pressure), the rotation pins may bend, a portion of the arms may bend, the bearing(s) may compress, other parts of the ball support and actuation assembly may deform, or a combination thereof, thereby enabling the contact surfaces of the ball to contact the corresponding contact surfaces of the cradle. Because the contact surfaces are configured to block movement of the ball toward the cradle while a substantial force is applied to the ball by fluid pressure (e.g., above-ball fluid pressure), the rotation pins 32 may be thinner than rotation pins configured to resist forces above the threshold force, thereby reducing the cost and/or size of the ball valve assembly. In certain embodiments, the ball is configured to rotate while the contact surfaces of the ball are engaged with the corresponding contact surfaces of the cradle. In such embodiments, the separation distance between the ball and the ball-facing surface of the cradle may be maintained, thereby reducing resistance to rotation of the ball (e.g., as compared to a ball that is in contact with the ball-facing surface). In certain embodiments, a lubricant and/or bushing(s)/bearing(s) may be disposed on at least one contact surface of the ball and/or at least one corresponding contact surface of the cradle.

The contact surfaces 48 of the ball 26 and the corresponding contact surfaces 50 of the cradle 28 are positioned remote from the ball-facing surface 66. As used herein, "ball-facing surface" refers to a surface of the cradle that faces the ball and is positioned at an end of the fluid passage through the cradle. In certain embodiments, the ball-facing surface is formed on a bushing of the cradle. In the illustrated embodiment, the contact surfaces 48 of the ball 26 are formed (e.g., machined, etc.) within a body of the ball. However, in other embodiments, at least one contact surface of the ball may be formed on an extension coupled to the ball. In addition, while each contact surface of the ball is arcuate (e.g., extending about a portion of the respective recess) in the illustrated embodiment, in other embodiments, at least one contact surface of the ball may be annular (e.g., extending about an entire periphery of the recess) or any other suitable shape. Furthermore, in the illustrated embodiment, the corresponding contact surfaces 50 of the cradle 28 are formed on the arms 30 of the cradle 28. However, in other embodiments, at least one corresponding contact surface may be formed on any other suitable portion of the cradle (e.g., the body of the cradle, an extension coupled to the cradle, etc.). For example, in certain embodiments, the arms of the cradle may be omitted and the openings may be formed within a body of the cradle. In such embodiments, at least one corresponding contact surface may be formed within the body of the cradle, and/or at least one corresponding contact surface may be formed on an extension coupled to the body of the cradle.

As previously discussed, the contact surfaces of the ball and the corresponding contact surfaces of the cradle are spaced apart from one another while a force urging the ball toward the cradle is less than or equal to the threshold force. In addition, the corresponding contact surfaces of the cradle are configured to engage the respective contact surfaces of the ball to block movement of the ball toward the cradle while the force is greater than the threshold force. The threshold force may be particularly selected for a ball valve assembly. For example, the threshold force may be selected by selecting the spacing between the contact surfaces of the ball and the corresponding contact surfaces of the cradle (e.g., by selecting the length of the arms of the cradle, the position of the corresponding contact surfaces of the cradle relative to the openings for the rotation pins, etc.). In addition, the threshold force may be selected by selecting the stiffness of the rotation pins (e.g., by selecting the diameter/thickness of the rotation pins, by selecting the material that forms in the rotation pins to control bending of the rotation pins, etc.). Accordingly, a target threshold force may be established for each ball valve assembly.

As previously discussed, the actuation pins 34 are configured to engage respective openings in the operator. Accordingly, translational movement of the operator drives the actuation pins 34 to translate along the longitudinal axis 64, thereby driving the ball to rotate. In the illustrated embodiment, each actuation pin 34 is disposed within a respective recess 68 in the ball 26. In certain embodiments, at least one actuation pin may be coupled to the ball (e.g., by being press fit into the respective recess, via an adhesive connection, via welding, via a threaded connection, via another suitable connection, or a combination thereof). Furthermore, in certain embodiments, at least one actuation pin may be integrally formed with the body of the ball (e.g., via a machining process, via an additive manufacturing process, via a casting process, or a combination thereof). In certain embodiments, one or more bushings and/or one or more bearing may be disposed about at least one actuation pin, such that the bushing(s)/bearing(s) are disposed between the actuation pin and the operator, thereby facilitating rotation the actuation pin relative to the operator. Furthermore, in certain embodiments, one or more bushings and/or one or more bearings may be disposed about at least one actuation pin, such that the bushing(s)/bearing(s) are disposed between the actuation pin and the ball, thereby facilitating rotation of the actuation pin relative to the ball.

Figure 4:
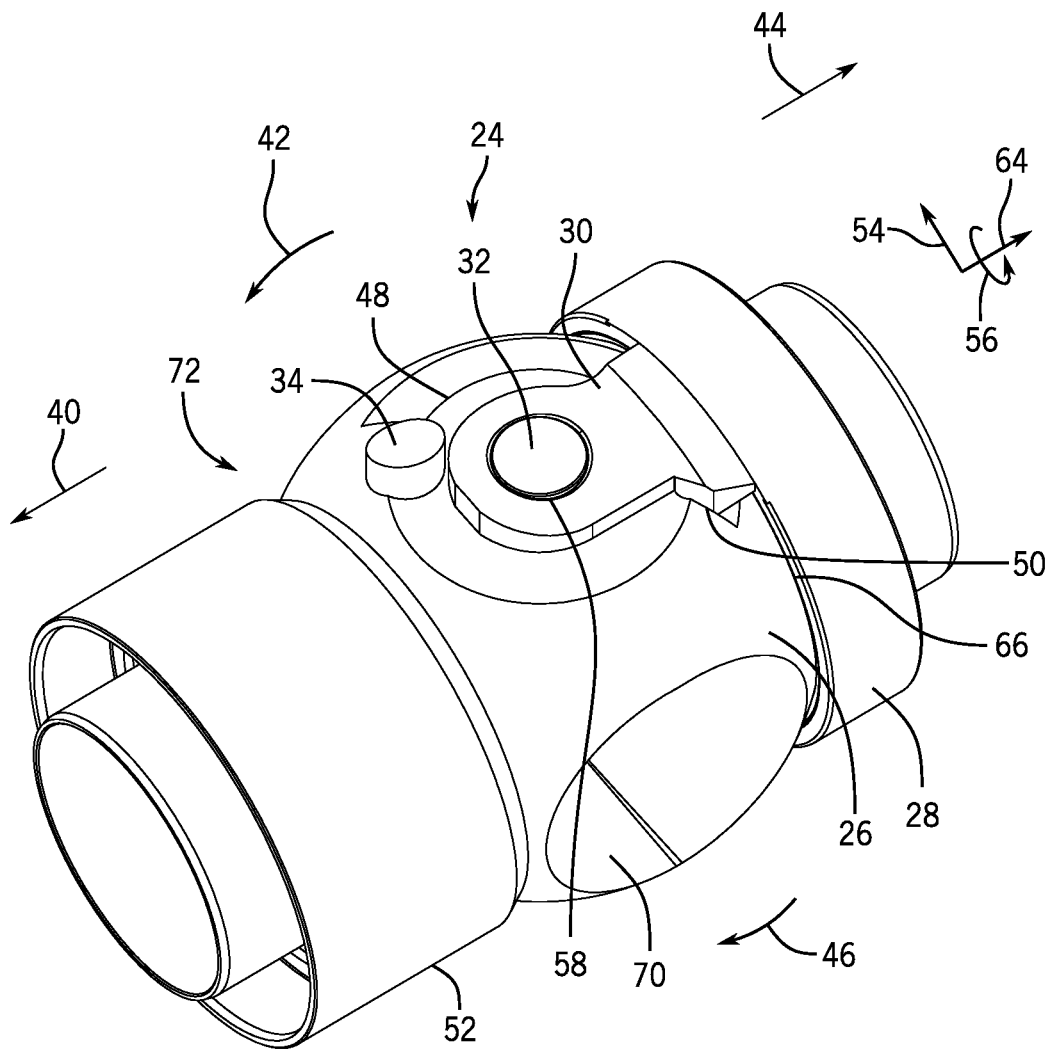
FIG. 4 is a perspective view of a portion of the ball support and actuation assembly of FIG. 2, in which a ball is in a closed position.

FIG. 4 is a perspective view of a portion of the ball support and actuation assembly 24 of FIG. 2, in which the ball 26 is in the closed position. While the ball 26 is in the illustrated closed position, the fluid pathway 70 through the ball 26 is offset from the fluid passage of the ball valve assembly. In addition, the seal 72, which is coupled to the seal retainer 52, is in contact with the ball 26, thereby blocking fluid flow through the ball valve assembly. Furthermore, in the illustrated embodiment, a portion of the cradle 28 (e.g., a respective arm 30 of the cradle 28) covers each bearing within the respective recess of the ball. Accordingly, the cradle (e.g., the arms of the cradle) may substantially block dirt and/or debris from entering the recesses/bearings, thereby facilitating rotation of the ball between the open and closed positions. Furthermore, in certain embodiments, wiper seal(s) positioned between one or more respective cradle arm(s) 30 and the ball may substantially block dirt and/or debris from entering the respective recess(es)/bearing(s).

While the contact surfaces are positioned to block movement of the ball toward the cradle in the illustrated embodiment, in other embodiments, additional contact surfaces may be positioned to block movement of the ball toward the seal retainer. For example, an additional contact surface of the ball may be spaced apart from a corresponding contact surface of the seal retainer (e.g., on an arm of the seal retainer) while a force urging the ball toward the seal retainer is less than or equal to a threshold force (e.g., second threshold force). In addition, the corresponding contact surface of the seal retainer may be configured to engage the additional contact surface of the ball to block movement of the ball toward the seal retainer while the force is greater than the threshold force. As a result, the contact force between the ball and the seal of the seal retainer may be reduced, thereby reducing resistance to rotation of the ball. In certain embodiments, the ball support and actuation assembly may include both types of contact surfaces (e.g., to block movement toward the cradle and to block movement toward the seal retainer), or the ball support and actuation assembly may include a single contact surface type.

Figure 5:
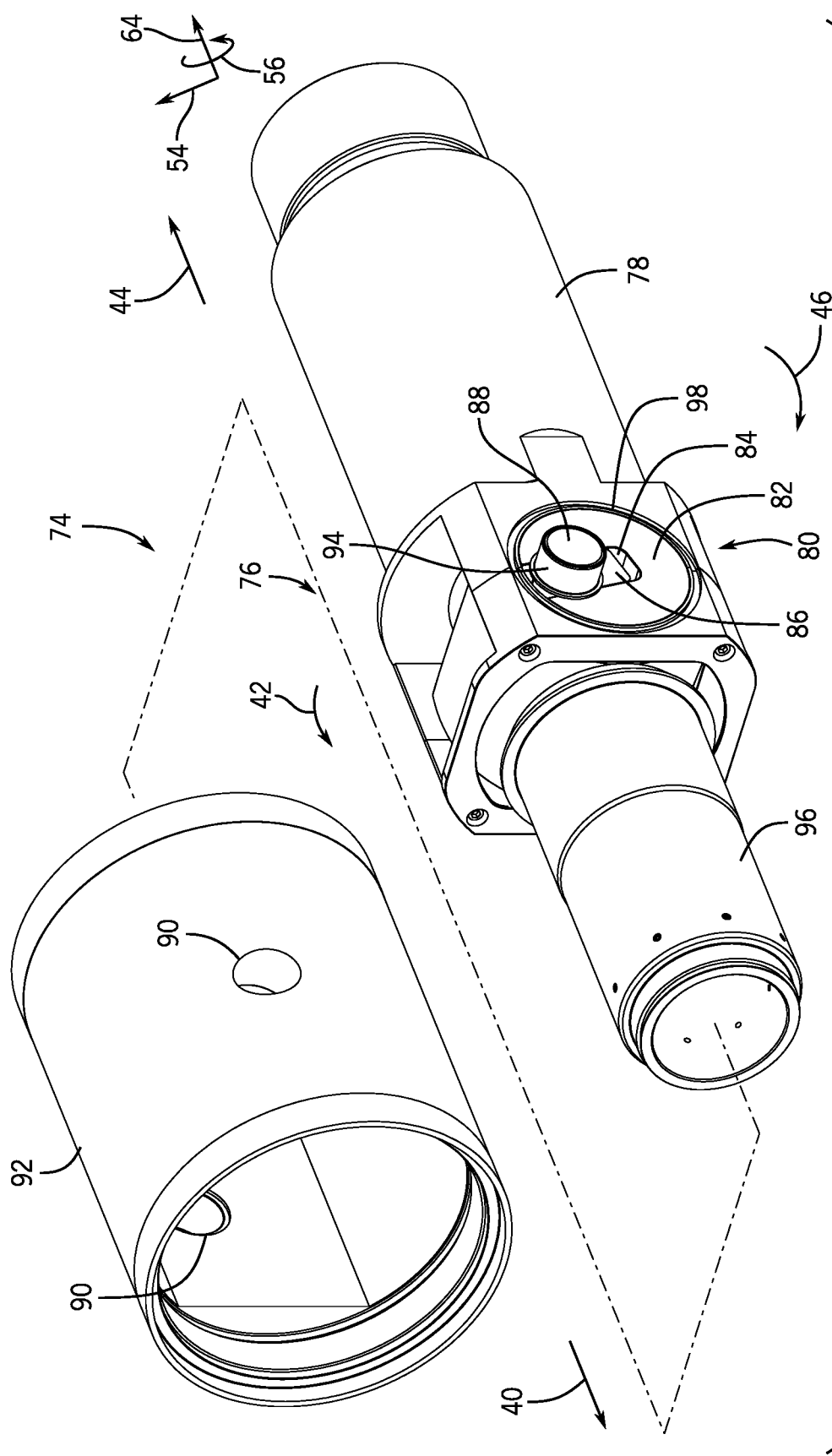
FIG. 5 is an exploded perspective view of another embodiment of a ball support and actuation assembly that may be employed within the ball valve assembly of FIG. 1.

FIG. 5 is an exploded perspective view of another embodiment of a ball support and actuation assembly 74 that may be employed within the ball valve assembly of FIG. 1. In the illustrated embodiment, the ball support and actuation assembly 74 includes a ball 76 configured to rotate between an open position and a closed position. The ball 76 includes a fluid pathway extending through the ball. The fluid pathway is configured to align with a fluid passage of the ball valve assembly while the ball is in the open position to enable fluid flow through the ball valve assembly. In addition, the fluid pathway is configured to be offset from the fluid passage while the ball is in the closed position to block fluid flow through the ball valve assembly.

The ball support and actuation assembly 74 also includes a cradle 78 configured to rotatably support the ball 76, thereby enabling the ball 76 to rotate between the open position and the closed position. In the illustrated embodiment, the cradle 78 includes openings 80, and circular protrusions 82 of the ball 76 engage the respective openings 80 (e.g., forming a trunnion mounting arrangement). Accordingly, the ball 76 may rotate about the circular protrusions 82 between the open and closed positions. Each circular protrusion may be coupled to a body of the ball or integrally formed with the body of the ball. Furthermore, in the illustrated embodiment, each circular protrusion 82 has a slot 84, and a slider 86 is disposed within the slot 84. Each slot 84 enables the respective slider 86 to translate, and rotation of each slider 86 relative to the respective slot 84 is substantially blocked by contact between the slider 86 and the material of the respective circular protrusion 82 forming the slot 84. In addition, an actuation pin 88 is coupled to (e.g., integrally formed with) each slider 86 and configured to engage an opening 90 of an operator 92.

Movement of the operator 92 in the first translational direction 40 drives the actuation pins 88 to rotate the ball 76 in the first rotational direction 42 from the open position to the illustrated closed position. In addition, movement of the operator 92 in the second translational direction 44 drives the actuation pins 88 to rotate the ball 76 in the second rotational direction 46 from the closed position to the open position. The slots 84 enable lateral movement of the respective actuation pins 88 as the operator 92 moves in the first and second translational directions. In the illustrated embodiment, a bushing 94 is disposed about each actuation pin 88, such that the bushing 94 is disposed between the actuation pin 88 and the respective opening 90 in the operator 92. The bushings 94 may reducing the friction between the actuation pins and the operator, thereby reducing the force sufficient to drive the operator along the longitudinal axis 64. While a single bushing is disposed about each actuation pin in the illustrated embodiment, in other embodiments, the bushing may be omitted from at least one actuation pin and/or multiple bushings may be disposed about at least one actuation pin. In addition, in certain embodiments, one or more bearings may be disposed about at least one actuation pin (e.g., alone or in combination with one or more bushings). While the actuation pins are coupled to respective sliders in the illustrated embodiment, in other embodiments, the actuation pins may be fixed to the ball and disposed within slots in the operator. The slots in the operator may enable the lateral movement of the actuation pins as the operator moves in the translational directions.

The operator 92 may be driven to move in the translational directions by any suitable device(s), such as one or more hydraulic pistons, one or more pneumatic pistons, one or more electromechanical actuators, other suitable type(s) of actuator(s), or a combination thereof. Furthermore, in certain embodiments, a spring (e.g., compression spring) may urge the operator to move in the first translational direction 40, thereby urging the ball 76 to rotate toward the closed position. The spring may provide sufficient force to drive the ball to the closed position in response to interruption in operation of the device(s) configured to drive the operator to translate. In such embodiments, the ball valve assembly is considered a failsafe closed ball valve assembly. However, in other embodiments, the ball valve assembly may be a failsafe open ball valve assembly, a fail-as-is ball valve assembly, or any other suitable type of ball valve assembly.

In the illustrated embodiments, a seal retainer 96 is positioned on an opposite side of the ball 76 from the cradle 78. In certain embodiments, the seal retainer 96 is urged toward the ball 76 along the second translational direction 44 by a spring and/or fluid pressure. A seal may be coupled to the seal retainer 96 (e.g., at an end of a fluid passage through the seal retainer) and engaged with the ball 76 while the ball is in the closed position. Contact between the seal and the ball blocks fluid flow through the ball valve assembly while the ball is in the closed position.

In the illustrated embodiment, a bearing 98 is disposed about each circular protrusion 82, such that the bearing 98 is disposed between the circular protrusion 82 and the cradle 78. The bearings 98 are configured to reduce rotational resistance, thereby facilitating rotation of the ball 76 between the open and closed position. In the illustrated embodiment, each bearing 98 is a ball bearing including an outer race non-rotatably coupled to the cradle 78 (e.g., via a press-fit connection, via a threaded connection, via a pinned connection, via a welded connection, via an adhesive connection, via another suitable connection, or a combination thereof). In addition, each bearing 98 includes an inner race non-rotatably coupled to the respective circular protrusion 82 (e.g., via a press-fit connection, via a threaded connection, via a pinned connection, via a welded connection, via an adhesive connection, via another suitable connection, or a combination thereof). Each bearing 98 also includes bearing balls disposed between the races to facilitate rotation of the inner race/ball relative to the outer race/cradle. In certain embodiments, wiper seal(s) may be positioned at one or more respective bearings to substantially block dirt and/or debris from entering the respective bearing(s).

While ball bearings are employed within the illustrated embodiment, in other embodiments, other suitable bearing(s) and/or bushing(s) may be disposed about at least one circular protrusion to facilitate rotation of the ball relative to the cradle. For example, while a single bearing is disposed about each circular protrusion in the illustrated embodiment, in other embodiments, multiple bearings and/or one or more bushings (e.g., alone, in combination with a single bearing, or in combination with multiple bearings) may be disposed about at least one circular protrusion. In certain embodiments, adjustment nut(s) may be used to couple the bearing(s) to each circular protrusion with sufficient force to substantially reduce or eliminate the possibility of disengagement of the bearing(s). Furthermore, in certain embodiments, no bearings and no bushings may be disposed about at least one circular protrusion. In such embodiments, a lubricant may be disposed about the circular protrusion(s) to facilitate rotation of the ball relative to the cradle. A lubricant may also be employed within the embodiments having one or more bearings (e.g., within the bearing(s)) and/or one or more bushings (e.g., on an inner surface of each bushing and/or on an outer surface of each bushing).

Because each slot 84 is disposed within a respective circular protrusion 82, the diameter of the circular protrusions may be increased (e.g., as compared to an embodiment in which the slots/actuation pins are positioned at another location on the ball), thereby increasing the strength of the circular protrusions (e.g., as compared to a ball having smaller circular protrusion). The strong circular protrusions may enable the maximum fluid pressure rating of the ball valve assembly to be increased. In addition, the bearings disposed about the circular protrusions facilitate rotation of the ball at the maximum fluid pressure rating of the ball valve assembly. Furthermore, the openings 80 are positioned to establish a separation distance between the ball and the ball-facing surface of the cradle (e.g., while the ball valve assembly is operating at the maximum fluid pressure rating), thereby reducing resistance to rotation of the ball.

Figure 6:
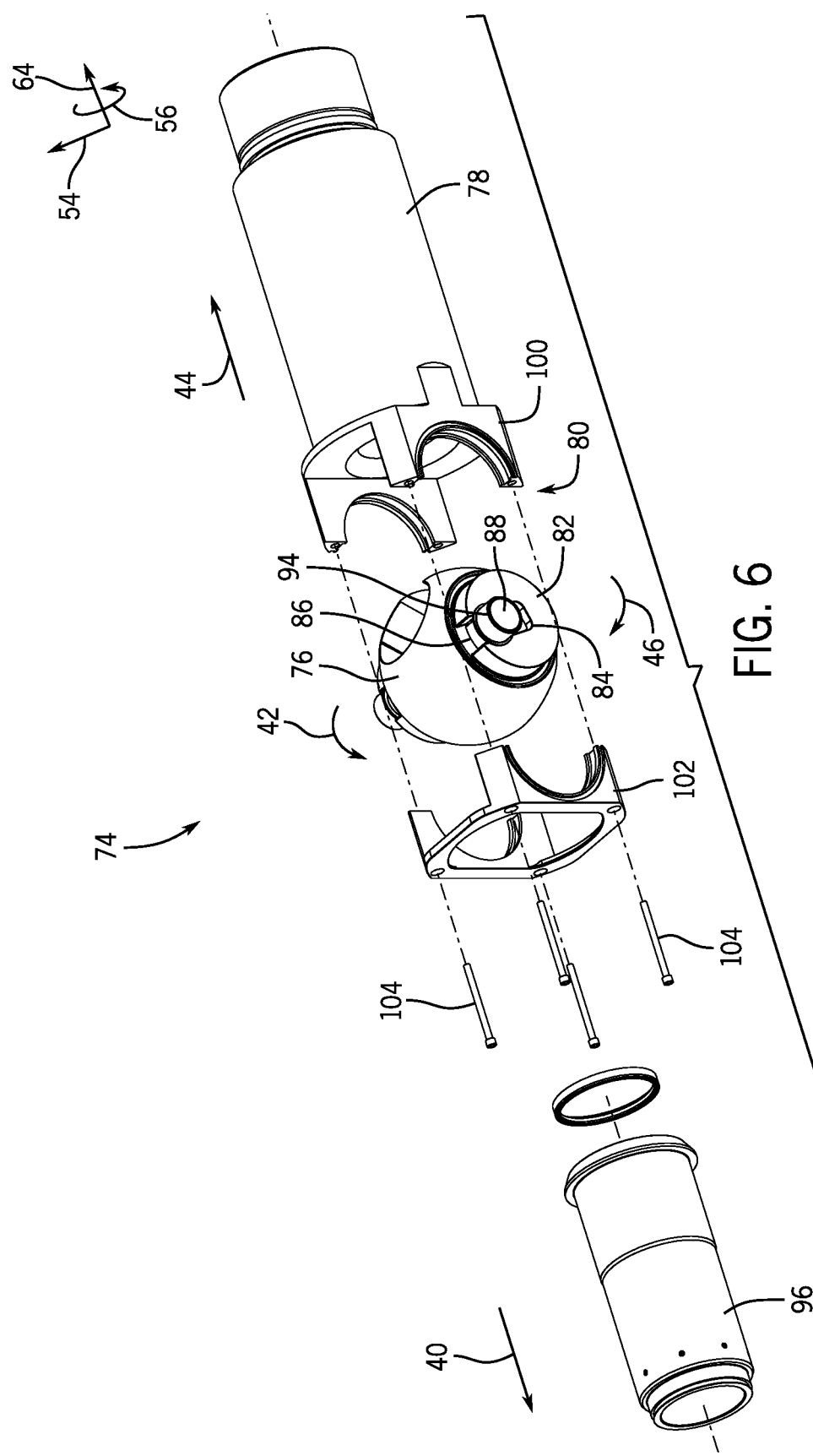
FIG. 6 is an exploded perspective view of a portion of the ball support and actuation assembly of FIG. 5.

FIG. 6 is an exploded perspective view of a portion of the ball support and actuation assembly 74 of FIG. 5. In the illustrated embodiment, the cradle 78 includes a first portion 100 forming a first portion of each opening 80, and the cradle 78 includes a second portion 102 forming a second portion of each opening 80. Accordingly, while the second portion 102 is coupled to the first portion 100, the circular protrusions 82 are captured within the openings 80 formed between the two portions. In the illustrated embodiment, the second portion 102 is coupled to the first portion 100 by fasteners 104. However, in other embodiments, the second portion may be coupled to the first portion by any other suitable connection system. Furthermore, in certain embodiments, the openings 80 within the cradle 78 may be formed by any other suitable structure of the cradle 78.

Figure 7:
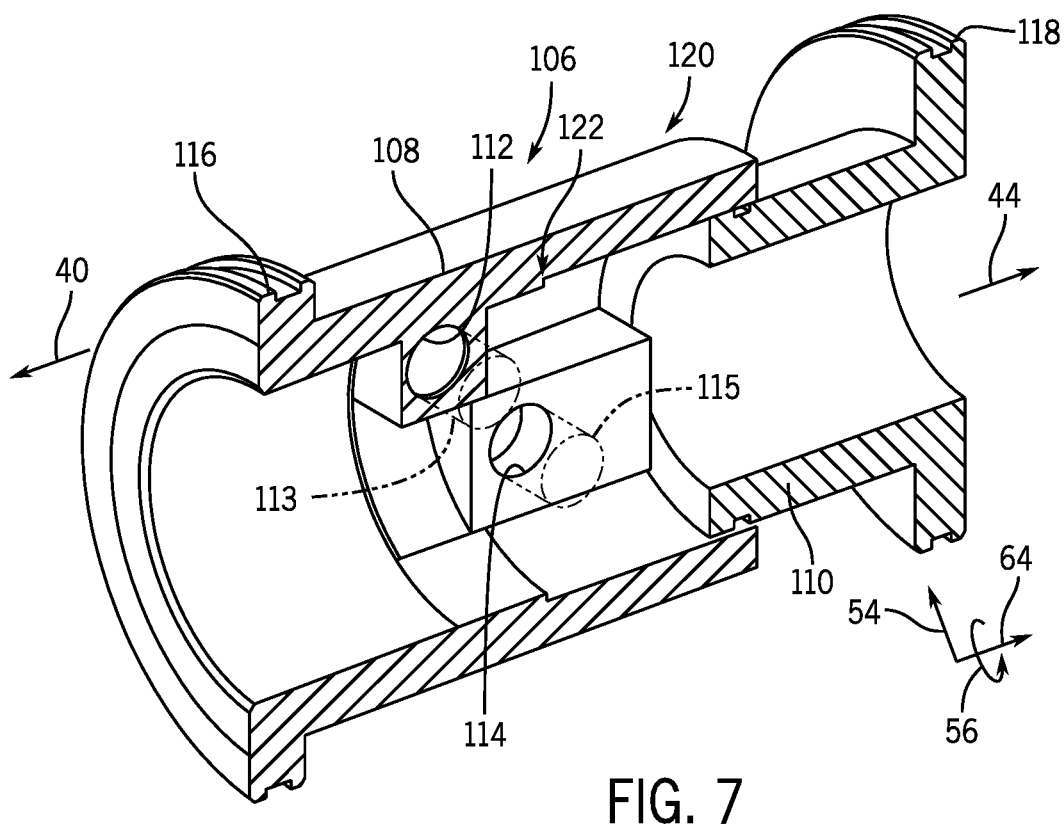
FIG. 7 is a cross-sectional perspective view of an embodiment of an operator assembly that may be employed within the ball valve assembly of FIG. 1, in which the operator assembly is in an open state.

FIG. 7 is a cross-sectional perspective view of an embodiment of an operator assembly 106 that may be employed within the ball valve assembly of FIG. 1, in which the operator assembly 106 is in an open state. In the illustrated embodiment, the operator assembly 106 includes a first operator 108 and a second operator 110. The first operator 108 has a first opening 112 configured to receive a first actuation pin 113, and the second operator 110 has a second opening 114 configured to receive a second actuation pin 115. The actuation pins may be positioned on opposite radial sides of the axis of rotation of the ball. In certain embodiments, the ball, such as the ball disclosed above with reference to FIGS. 2-4 or the ball disclosed above with reference to FIGS. 5-6, includes at least one slot configured to receive two sliders. Each slider is configured to move independently within the slot. In addition, the first actuation pin, which is received by the first opening of the first operator, is coupled to (e.g., integrally formed with) the first slider, and the second actuation pin, which is received by the second opening of the second operator, is coupled to (e.g., integrally formed with) the second slider. In certain embodiments, the ball may include two slots, and one first slider and one second slider may be disposed within each slot. In such embodiments, the first operator may include two first openings positioned on opposite sides of the ball along the axis of rotation of the ball, in which each first opening is configured to receive a respective first actuation pin, and the second operator may include two second openings positioned on opposite sides of the ball along the axis of rotation of the ball, in which each second opening is configured to receive a respective second actuation pin.

In the illustrated embodiment, a portion of the second operator 110 is disposed within a passage of the first operator 108. The outer dimensions of the portion of the second operator disposed within the passage of the first operator may be substantially equal to the inner dimensions of the passage of the first operator, thereby reducing radial movement of the second operator relative to the first operator. While the portion of the second operator disposed within the passage of the first operator and the passage of the first operator having substantially circular cross-sections in the illustrated embodiment, in other embodiment, the portion of the second operator and the passage of the first operator may have any other suitable cross-sectional shape (e.g., polygonal, etc.). Furthermore, while the portion of the second operator is disposed within the passage of the first operator in the illustrated embodiment, in other embodiments, a portion of the first operator may be disposed within a passage of the second operator. Furthermore, in the illustrated embodiment, each opening is formed within an extension of the respective operator. However, in other embodiments, at least one opening may be formed within another suitable portion of the respective operator.

While the operator assembly 106 is in the illustrated open state, the respective ball is in the open position. To transition the ball to the closed position, the operators are moved toward one another. For example, movement of the first operator 108 in the second translational direction 44 drives the first actuation pin(s) to rotate the ball toward the closed position. In addition, movement of the second operator 110 in the first translational direction 40 drives the second actuation pin(s) to rotate the ball toward the closed position. The slot(s) within the ball enable the lateral movement of the respective actuation pins as the operators move toward one another. In certain embodiments, the first operator 108 may be driven to move in the second translational direction 44 by hydraulic fluid pressure applied to a piston 116 of the first operator 108. In addition, the second operator 110 may be driven to move in the first translational direction 40 by hydraulic fluid pressure applied to a piston 118 of the second operator 110. Because hydraulic fluid pressure is applied to two pistons to drive the ball to the closed position, significantly more torque may be applied to the ball than a configuration having a single piston. As a result, the ball may apply additional force to cut a line (e.g., wireline, coil tubing, etc.) extending through the fluid passage of the ball while the ball is in the open position. In addition, if operation of one operator is interrupted (e.g., due to an interruption in hydraulic fluid flow), and the operator is free to move, the other operator may drive the ball to rotate to the closed position. While hydraulic fluid pressure is used to drive the operator assembly 106 to the closed state in the illustrated embodiment, in other embodiments, at least one operator may be driven toward the closed state by another suitable actuation fluid. For example, in certain embodiments, at least one operator may be driven toward the closed state by pneumatic pressure applied to the respective piston. Furthermore, in certain embodiments, at least one operator may be driven to the closed state by one or more actuator(s), such as electrically-operated actuator(s), pneumatically-operated actuator(s), hydraulically-operated actuator(s), or a combination thereof.

Furthermore, in certain embodiments, a first spring (e.g., compression spring) may urge the first operator 108 to move in the second translational direction 44, and a second spring (e.g., compression spring) may urge the second operator 110 to move in the first translational direction 40, thereby urging the operators toward one another, such that the ball is urged toward the closed position. In certain embodiments, each spring may provide sufficient force to drive the ball to the closed position in response to an interruption in fluid flow to the pistons/operation of the actuator(s). Accordingly, the respective ball valve assembly is a failsafe closed ball valve assembly. In addition, because each spring is configured to provide sufficient force to rotate the ball to the closed position, the ball valve assembly may maintain the failsafe closed functionality even if the force provided by one spring is reduced (e.g., in response to fatigue, etc.). Furthermore, the fatigue experienced by each spring may be reduced, as compared to utilizing a single spring to drive the operator assembly to the closed state. While utilizing two springs to drive the operator assembly to the closed state is disclosed above, in certain embodiments, a single spring may be used to drive at least one operator to the closed state, or one or more springs may be used to drive the operators to the open state (e.g., forming a failsafe open ball valve assembly). Furthermore, any suitable type(s) of spring(s) (e.g., coil spring(s), leaf spring(s), pneumatic spring(s), hydraulic spring(s), electromagnetic spring(s), etc.) may be utilized to urge at least one operator in a desired direction.

Figure 8:
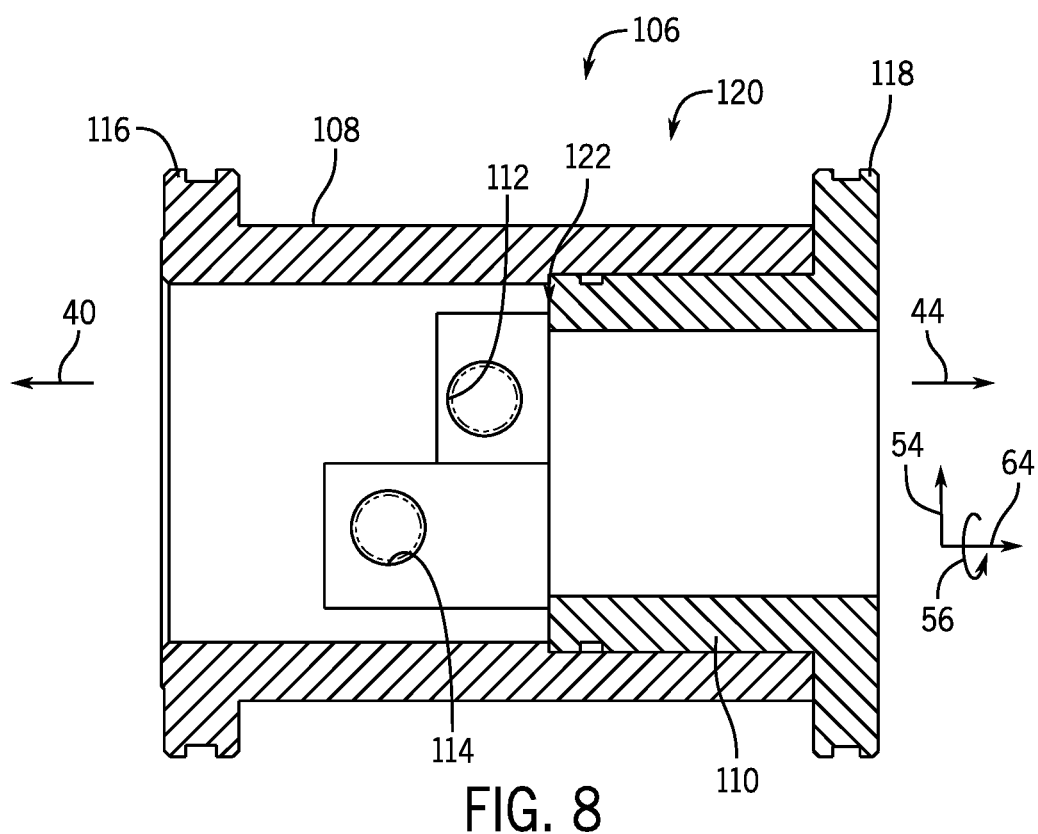
FIG. 8 is a cross-sectional view of the operator assembly of FIG. 7, in which the operator assembly is in a closed state.

FIG. 8 is a cross-sectional view of the operator assembly 106 of FIG. 7, in which the operator assembly 106 is in a closed state. While the operator assembly 106 is in the illustrated closed state, the respective ball is in the closed position. To transition the ball to the open position, the operators are moved away from one another. For example, movement of the first operator 108 in the first translational direction 40 drives the first actuation pin(s) to rotate the ball toward the open position. In addition, movement of the second operator 110 in the second translational direction 44 drives the second actuation pin(s) to rotate the ball toward the open position. The slot(s) within the ball enable the lateral movement of the respective actuation pins as the operators move away from one another. Furthermore, while the operator assembly 106 is in the closed state, the operators engage one another, thereby blocking further rotation of the ball. However, in other embodiments, another suitable stop assembly/device may be used to block rotation of the ball past the closed position.

In certain embodiments, the first operator 108 may be driven to move in the first translational direction 40 by hydraulic fluid pressure applied to the piston 116 of the first operator 108. In addition, the second operator 110 may be driven to move in the second translational direction 44 by hydraulic fluid pressure applied to the piston 118 of the second operator 110. The pressurized hydraulic fluid may be supplied to a chamber 120 (e.g., annular chamber) extending between the piston 116 of the first operator 108 and the piston 118 of the second operator 110. However, in other embodiments, the pressurized hydraulic fluid may be supplied to multiple chambers positioned between the pistons (e.g., one chamber for each piston). In certain embodiments, pressurized fluid from the well bore may also be directed to a region 122 between the operators, thereby further urging the operators to move away from one another. Because hydraulic fluid pressure is applied to two pistons to drive the ball to the open position, significantly more torque may be applied to the ball than a configuration having a single piston. As a result, the static friction between the ball and respective contact surface(s) may be overcome by the torque applied by the operator assembly, thereby facilitating the transition between the closed position and the open position of the ball. In addition, if operation of one operator is interrupted (e.g., due to an interruption in hydraulic fluid flow), and the operator is free to move, the other operator may drive the ball to rotate to the open position. In certain embodiments, a first hydraulic line may extend to the chamber 120, a second hydraulic line may provide pressurized hydraulic fluid to urge the first operator 108 to move in the second translational direction 44, and a third hydraulic line may provide pressurized hydraulic fluid to urge the second operator 110 to move in the first translational direction 40. However, in other embodiments, any other suitable hydraulic line configuration may be used to control movement of the operators. While hydraulic fluid pressure is used to drive the operator assembly 106 to the open state in the illustrated embodiment, in other embodiments, at least one operator may be driven toward the open state by another suitable actuation fluid. For example, in certain embodiments, at least one operator may be driven toward the open state by pneumatic pressure applied to the respective piston. Furthermore, in certain embodiments, at least one operator may be driven to the open state by one or more actuator(s), such as electrically-operated actuator(s), pneumatically-operated actuator(s), hydraulically-operated actuator(s), or a combination thereof.

The operator assembly disclosed herein with reference to FIGS. 7-8 may be used with the ball support and actuation assembly disclosed above with reference to FIGS. 2-4 and with the ball support and actuation assembly disclosed above with reference to FIGS. 5-6. For example, with regard to the ball support and actuation assembly disclosed above with reference to FIGS. 5-6, two sliders may be disposed within each slot, and an actuation pin may be coupled to each slider and configured to engage a corresponding opening of a respective operator. Furthermore, in embodiments of the ball support and actuation assembly of FIGS. 5-6 in which the actuation pin(s) are fixed to the ball, two actuation pins may be fixed to at least one side of the ball. In addition, each actuation pin may be engaged with a corresponding opening of a respective operator, and the corresponding openings may be slot-shaped to accommodate lateral movement of the actuation pins. With regard to the ball support and actuation assembly disclosed above with reference to FIGS. 2-4, two actuation pins may be fixed to at least one side of the ball. In addition, each actuation pin may be engaged with a corresponding opening of a respective operator, and the corresponding openings may be slot-shape to accommodate lateral movement of the actuation pins. Furthermore, in embodiments of the ball support and actuation assembly of FIGS. 2-4 in which the actuation pin(s) are coupled to slider(s) disposed within respective slot(s) in the ball, two sliders may be disposed within each slot, and an actuation pin may be coupled to each slider and configured to engage a corresponding opening of a respective operator.

While the operator assembly is in the open state while the operators are farther apart and in the closed state while the operators are closer together in the illustrated embodiment, in other embodiments, the operator assembly may be in the closed state while the operators are farther apart and in the open state while the operators are closer together. In such embodiments, a compression spring may be disposed between the operators to urge the operators away from one another, thereby establishing a failsafe closed ball valve assembly. Furthermore, pressurized fluid from the well bore may be directed to the region between the operators, thereby further urging the operators to move away from one another (e.g., to further enhance the failsafe closed functionality of the respective ball valve assembly).

Figure 9:
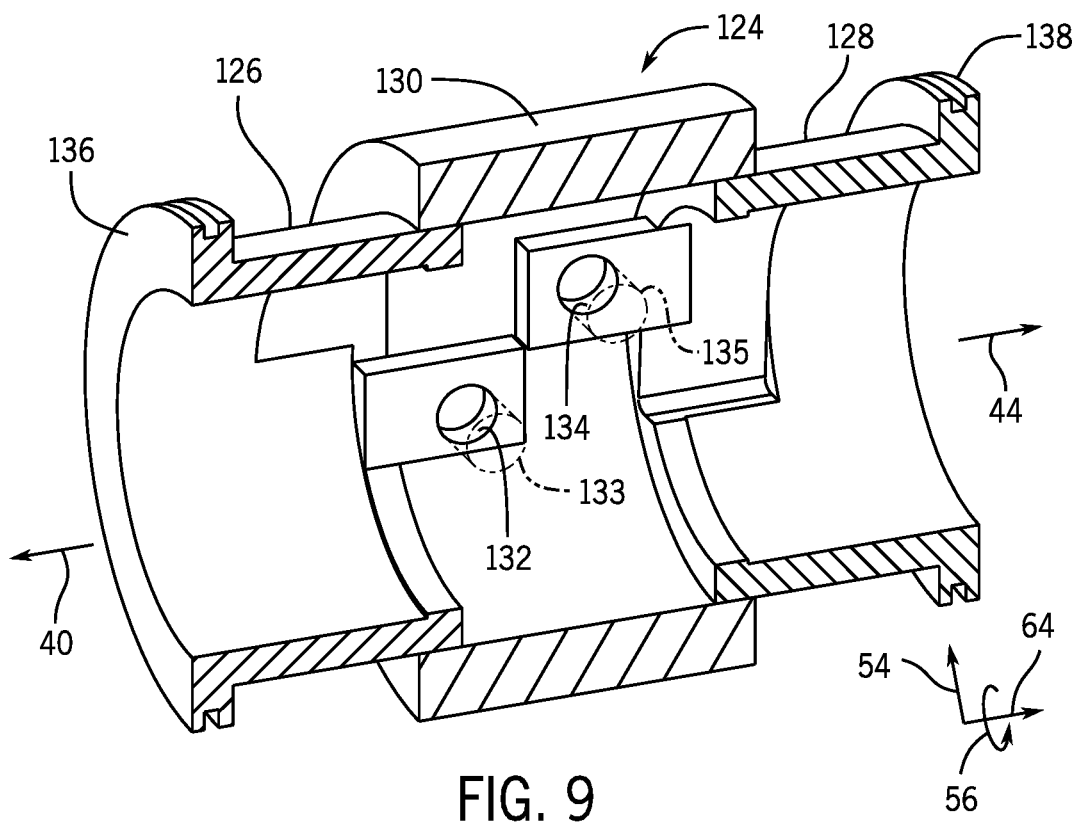
FIG. 9 is a cross-sectional perspective view of another embodiment of an operator assembly that may be employed within the ball valve assembly of FIG. 1, in which the operator assembly is in a closed state.

FIG. 9 is a cross-sectional perspective view of another embodiment of an operator assembly 124 that may be employed within the ball valve assembly of FIG. 1, in which the operator assembly is in a closed state. In the illustrated embodiment, the operator assembly 124 includes a first operator 126 and a second operator 128. As illustrated, the first operator 126 and the second operator 128 are disposed within a housing 130 and configured to move relative to the housing 130. The first operator 126 has a first opening 132 configured to receive a first actuation pin 133, and the second operator 128 has a second opening 134 configured to receive a second actuation pin 135. The actuation pins may be positioned on opposite radial sides of the axis of rotation of the ball. In certain embodiments, the ball, such as the ball disclosed above with reference to FIGS. 2-4 or the ball disclosed above with reference to FIGS. 5-6, includes at least one slot configured to receive two sliders. Each slider is configured to move independently within the slot. In addition, the first actuation pin, which is received by the first opening of the first operator, is coupled to (e.g., integrally formed with) the first slider, and the second actuation pin, which is received by the second opening of the second operator, is coupled to (e.g., integrally formed with) the second slider. In certain embodiments, the ball may include two slots, and one first slider and one second slider may be disposed within each slot. In such embodiments, the first operator may include two first openings positioned on opposite sides of the ball along the axis of rotation of the ball, in which each first opening is configured to receive a respective first actuation pin, and the second operator may include two second openings positioned on opposite sides of the ball along the axis of rotation of the ball, in which each second opening is configured to receive a respective second actuation pin.

In the illustrated embodiment, each opening is formed within an extension of the respective operator. In addition, each operator includes recess(es) configured to receive the extension(s) of the other operator, thereby facilitating movement of the operators to the open state. While each opening is formed within an extension in the illustrated embodiment, in other embodiments, at least one opening may be formed within another suitable portion of the respective operator. Furthermore, in the illustrated embodiment, the structure of the first operator is the same as the structure of the second operator. Accordingly, a single operator may be used as either the first operator or the second operator. As a result, the design and/or manufacturing cost of the operator assembly may be reduced (e.g., as compared to an operator assembly that include different configurations for the first and second operators). In addition, the forces applied to operators by friction and pressurized fluids may be substantially equal, thereby facilitating balanced operation of the valve assembly. However, in other embodiments, the first and second operators may be different from one another.

While the operator assembly 124 is in the illustrated closed state, the respective ball is in the closed position. To transition the ball to the open position, the operators are moved toward one another. For example, movement of the first operator 126 in the second translational direction 44 drives the first actuation pin(s) to rotate the ball toward the open position. In addition, movement of the second operator 128 in the first translational direction 40 drives the second actuation pin(s) to rotate the ball toward the open position. The slot(s) within the ball enable the lateral movement of the respective actuation pins as the operators move toward one another. In certain embodiments, the first operator 126 may be driven to move in the second translational direction 44 by hydraulic fluid pressure applied to a piston 136 of the first operator 126. In addition, the second operator 128 may be driven to move in the first translational direction 40 by hydraulic fluid pressure applied to a piston 138 of the second operator 128. Because hydraulic fluid pressure is applied to two pistons to drive the ball to the open position, significantly more torque may be applied to the ball than a configuration having a single piston. As a result, the static friction between the ball and respective contact surface(s) may be overcome by the torque applied by the operator assembly, thereby facilitating the transition between the closed position and the open position of the ball. In addition, because the cross-sectional areas of the pistons are substantially equal to one another, the torques applied by the operators to the ball may be substantially equal to one another. Furthermore, if operation of one operator is interrupted (e.g., due to an interruption in hydraulic fluid flow), and the operator is free to move, the other operator may drive the ball to rotate to the open position. While hydraulic fluid pressure is used to drive the operator assembly 124 to the open state in the illustrated embodiment, in other embodiments, at least one operator may be driven toward the open state by another suitable actuation fluid. For example, in certain embodiments, at least one operator may be driven toward the open state by pneumatic pressure applied to the respective piston. Furthermore, in certain embodiments, at least one operator may be driven to the open state by one or more actuator(s), such as electrically-operated actuator(s), pneumatically-operated actuator(s), hydraulically-operated actuator(s), or a combination thereof.

Figure 10:
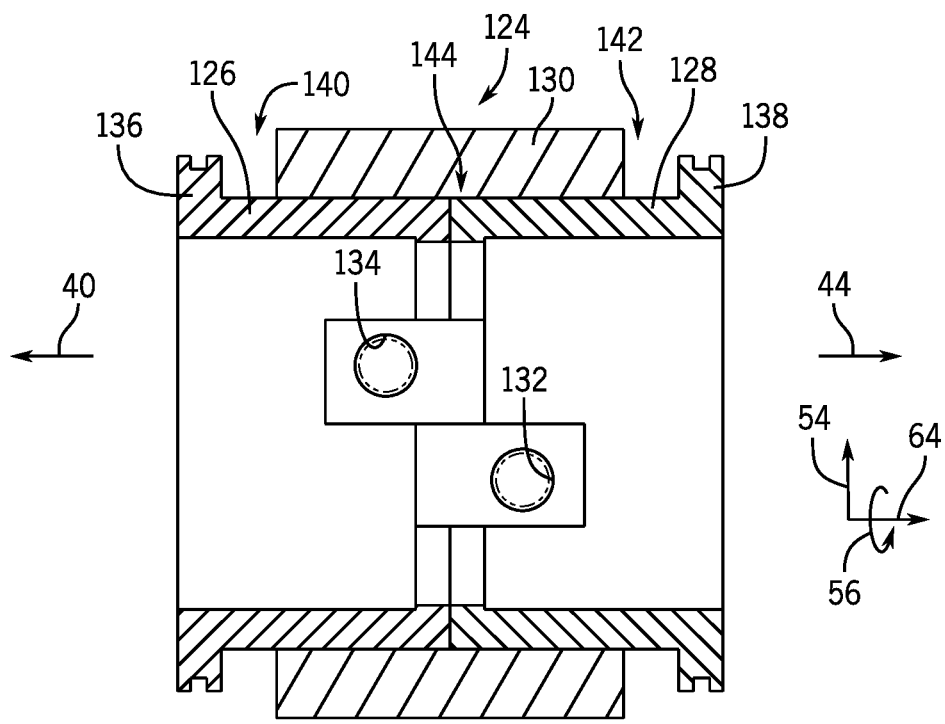
FIG. 10 is a cross-sectional view of the operator assembly of FIG. 9, in which the operator assembly is in an open state.

FIG. 10 is a cross-sectional view of the operator assembly 124 of FIG. 9, in which the operator assembly is in an open state. While the operator assembly 124 is in the illustrated open state, the respective ball is in the open position. To transition the ball to the closed position, the operators are moved away from one another. For example, movement of the first operator 126 in the first translational direction 40 drives the first actuation pin(s) to rotate the ball toward the closed position. In addition, movement of the second operator 128 in the second translational direction 44 drives the second actuation pin(s) to rotate the ball toward the closed position. The slot(s) within the ball enable the lateral movement of the respective actuation pins as the operators move away from one another. Furthermore, while the operator assembly 124 is in the open state, the operators engage one another, thereby blocking further rotation of the ball. However, in other embodiments, another suitable stop assembly/device may be used to block rotation of the ball past the open position.

In certain embodiments, the first operator 126 may be driven to move in the first translational direction 40 by hydraulic fluid pressure applied to the piston 136 of the first operator 126. In addition, the second operator 128 may be driven to move in the second translational direction 44 by hydraulic fluid pressure applied to the piston 138 of the second operator 128. The pressurized hydraulic fluid may be supplied to a first chamber 140 (e.g., annular chamber) extending between the piston 136 of the first operator 126 and the housing 130, and the pressurized hydraulic fluid may be supplied to a second chamber 142 (e.g., annular chamber) extending between the piston 138 of the second operator 128 and the housing 130. However, in other embodiments, the pressurized hydraulic fluid may be supplied to a single chamber positioned between the pistons (e.g., having a portion that extends through the housing). Because hydraulic fluid pressure is applied to two pistons to drive the ball to the closed position, significantly more torque may be applied to the ball than a configuration having a single piston. As a result, the ball may apply additional force to cut a line (e.g., wireline, coil tubing, etc.) extending through the fluid passage of the ball while the ball is in the open position. In addition, because the cross-sectional areas of the first and second chambers are substantially equal to one another, the torques applied by the operators to the ball may be substantially equal to one another. Furthermore, if operation of one operator is interrupted (e.g., due to an interruption in hydraulic fluid flow), and the operator is free to move, the other operator may drive the ball to rotate to the closed position. In certain embodiments, a first hydraulic line may extend to the first chamber 140, a second hydraulic line may extend to the second chamber 142, a third hydraulic line may provide pressurized hydraulic fluid to urge the first operator 126 to move in the second translational direction 44, and a fourth hydraulic line may provide pressurized hydraulic fluid to urge the second operator 128 to move in the first translational direction 40. However, in other embodiments, any other suitable hydraulic line configuration may be used to control movement of the operators. While hydraulic fluid pressure is used to drive the operator assembly 124 to the closed state in the illustrated embodiment, in other embodiments, at least one operator may be driven toward the closed state by another suitable actuation fluid. For example, in certain embodiments, at least one operator may be driven toward the closed state by pneumatic pressure applied to the respective piston. Furthermore, in certain embodiments, at least one operator may be driven to the closed state by one or more actuator(s), such as electrically-operated actuator(s), pneumatically-operated actuator(s), hydraulically-operated actuator(s), or a combination thereof.

Furthermore, in certain embodiments, a first compression spring may be disposed between the piston 136 of the first operator 126 and the housing 130, and a second compression spring may be disposed between the piston 138 of the second operator 128 and the housing 130. The first compression spring may urge the first operator 126 to move in the first translational direction 40, and the second compression spring may urge the second operator 128 to move in the second translational direction 44, thereby urging the operators away from one another, such that the ball is urged toward the closed position. In certain embodiments, each compression spring may provide sufficient force to drive the ball to the closed position in response to an interruption in fluid flow to the pistons/operation of the actuator(s). Accordingly, the respective ball valve assembly is a failsafe closed ball valve assembly. In addition, because each compression spring is configured to provide sufficient force to rotate the ball to the closed position, the ball valve assembly may maintain the failsafe closed functionality even if the force provided by one compression spring is reduced (e.g., in response to fatigue, etc.). Furthermore, the fatigue experienced by each compression spring may be reduced, as compared to utilizing a single spring to drive the operator assembly to the closed state. In certain embodiments, pressurized fluid from the well bore may be directed to a region 144 between the operators, thereby further urging the operators to move away from one another (e.g., to further enhance the failsafe closed functionality of the respective ball valve assembly). While utilizing two compression springs to drive the operator assembly to the closed state is disclosed above, in certain embodiments, a single compression spring may be used to drive at least one operator to the closed state, or one or more compression springs may be used to drive the operators to the open state (e.g., forming a failsafe open ball valve assembly). Furthermore, while compression spring(s) are disclose above, any other suitable type(s) of spring(s) (e.g., coil spring(s), leaf spring(s), pneumatic spring(s), hydraulic spring(s), electromagnetic spring(s), etc.) may be utilized (e.g., alone or in combination with the compression spring(s)) to urge at least one operator in a desired direction.

The operator assembly disclosed herein with reference to FIGS. 9-10 may be used with the ball support and actuation assembly disclosed above with reference to FIGS. 2-4 and with the ball support and actuation assembly disclosed above with reference to FIGS. 5-6. For example, with regard to the ball support and actuation assembly disclosed above with reference to FIGS. 5-6, two sliders may be disposed within each slot, and an actuation pin may be coupled to each slider and configured to engage a corresponding opening of a respective operator. Furthermore, in embodiments of the ball support and actuation assembly of FIGS. 5-6 in which the actuation pin(s) are fixed to the ball, two actuation pins may be fixed to at least one side of the ball. In addition, each actuation pin may be engaged with a corresponding opening of a respective operator, and the corresponding openings may be slot-shaped to accommodate lateral movement of the actuation pins. With regard to the ball support and actuation assembly disclosed above with reference to FIGS. 2-4, two actuation pins may be fixed to at least one side of the ball. In addition, each actuation pin may be engaged with a corresponding opening of a respective operator, and the corresponding openings may be slot-shape to accommodate lateral movement of the actuation pins. Furthermore, in embodiments of the ball support and actuation assembly of FIGS. 2-4 in which the actuation pin(s) are coupled to slider(s) disposed within respective slot(s) in the ball, two sliders may be disposed within each slot, and an actuation pin may be coupled to each slider and configured to engage a corresponding opening of a respective operator.

While the operator assembly is in the closed state while the operators are spaced farther apart and in the open state while the operators are closer together in the illustrated embodiment, in other embodiments, the operator assembly may be in the open state while the operators are spaced farther apart and in the closed state while the operators are closer together. In such embodiments, opposing compression springs may urge the operators toward one another, thereby establishing a failsafe closed ball valve assembly. In certain embodiments, each spring is configured to provide sufficient force to rotate the ball to the closed position. Accordingly, the ball valve assembly may maintain the failsafe closed functionality even if the force provided by one spring is reduced (e.g., in response to fatigue, etc.). Furthermore, while the operator assemblies of FIGS. 7-10 are disclosed above with reference to driving a ball between an open position and a closed position, each operator assembly may also be used to drive another suitable valve element, such as a disc of a butterfly valve, between the open and closed positions.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ball valve assembly, comprising:
a ball configured to rotate between an open position and a closed position; and
a cradle having a ball-facing surface, wherein the ball-facing surface faces the ball and is positioned at an end of a fluid passage through the cradle, the cradle is configured to rotatably support the ball to enable the ball to rotate between the open position and the closed position, and the cradle is configured to block movement of the ball toward the ball-facing surface to establish a separation distance between the ball and the ball-facing surface;
wherein the ball has a contact surface, the cradle has a corresponding contact surface remote from the ball-facing surface, the contact surface of the ball and the corresponding contact surface of the cradle are spaced apart from one another while a force urging the ball toward the cradle is less than or equal to a threshold force, and the corresponding contact surface of the cradle is configured to engage the contact surface of the ball to block movement of the ball toward the cradle while the force is greater than the threshold force to establish the separation distance between the ball and the ball-facing surface of the cradle.

2. The ball valve assembly of claim 1, comprising a rotation pin engaged with the cradle, wherein the ball has a recess, the rotation pin is disposed within the recess, and the ball is configured to rotate about the rotation pin.

3. The ball valve assembly of claim 2, comprising a bearing disposed about the rotation pin within the recess, wherein the rotation pin is non-rotatably coupled to the cradle.

4. The ball valve assembly of claim 3, wherein a portion of the cradle covers the bearing within the recess.

5. The ball valve assembly of claim 1, comprising an actuation pin coupled to the ball and configured to drive the ball to rotate relative to the cradle.

6. The ball valve assembly of claim 1, comprising two actuation pins coupled to at least one side of the ball.

7. The ball valve assembly of claim 5, comprising two operators configured to move toward one another and away from one another to drive the two actuation pins to rotate the ball.

8. The ball valve assembly of claim 7, comprising a housing disposed about the two operators.

9. A ball valve assembly, comprising:
a ball configured to rotate between an open position and a closed position, wherein the ball has a contact surface;
a cradle comprising an arm configured to rotatably support the ball, wherein the arm has a corresponding contact surface; and
a rotation pin engaged with the arm, wherein the ball is configured to rotate about the rotation pin;
wherein the contact surface of the ball and the corresponding contact surface of the arm of the cradle are spaced apart from one another while a force urging the ball toward the cradle is less than or equal to a threshold force, and the corresponding contact surface of the arm of the cradle is configured to engage the contact surface of the ball to block movement of the ball toward the cradle while the force is greater than the threshold force.

10. The ball valve assembly of claim 9, comprising:
a bearing;
wherein the ball has a recess, the rotation pin is disposed within the recess, the bearing is disposed about the rotation pin within the recess, and the rotation pin is non-rotatably coupled to the arm of the cradle.

11. The ball valve assembly of claim 9, comprising:
a second rotation pin;
wherein the ball has a second contact surface, the cradle comprises a second arm configured to rotatably support the ball, the second arm has a second corresponding contact surface, the second rotation pin is engaged with the arm, the ball is configured to rotate about the second rotation pin, the second contact surface of the ball and the second corresponding contact surface of the second arm of the cradle are spaced apart from one another while the force urging the ball toward the cradle is less than or equal to the threshold force, and the second corresponding contact surface of the second arm of the cradle is configured to engage the second contact surface of the ball to block movement of the ball toward the cradle while the force is greater than the threshold force.

12. The ball valve assembly of claim 9, comprising an actuation pin coupled to the ball and configured to drive the ball to rotate relative to the cradle.

13. The ball valve assembly of claim 9, comprising:
two actuation pins coupled to at least one side of the ball; and
two operators configured to move toward one another and away from one another to drive the two actuation pins to rotate the ball.

14. A ball valve assembly, comprising:
a ball configured to rotate between an open position and a closed position, wherein the ball has a contact surface;
a cradle comprising an arm having a corresponding contact surface;

a rotation pin engaged with the arm, wherein the ball is configured to rotate about the rotation pin;
an actuation pin coupled to the ball; and
an operator disposed about the ball, wherein the actuation pin is engaged with an opening in the operator, and the operator is configured to translate to drive the actuation pin to rotate the ball;
wherein the contact surface of the ball and the corresponding contact surface of the arm of the cradle are spaced apart from one another while a force urging the ball toward the cradle is less than or equal to a threshold force, and the corresponding contact surface of the arm of the cradle is configured to engage the contact surface of the ball to block movement of the ball toward the cradle while the force is greater than the threshold force.

15. The ball valve assembly of claim 14, comprising:
a second rotation pin;
wherein the ball has a second contact surface, the cradle comprises a second arm having a second corresponding contact surface, the second rotation pin is engaged with the arm, the ball is configured to rotate about the second rotation pin, the second contact surface of the ball and the second corresponding contact surface of the second arm of the cradle are spaced apart from one another while the force urging the ball toward the cradle is less than or equal to the threshold force, and the second corresponding contact surface of the second arm of the cradle is configured to engage the second contact surface of the ball to block movement of the ball toward the cradle while the force is greater than the threshold force.

16. The ball valve assembly of claim 15, comprising a second actuation pin coupled to the ball, wherein the second actuation pin is engaged with a second opening in the operator, and the operator is configured to translate to drive the second actuation pin to rotate the ball.

17. The ball valve assembly of claim 14, comprising:
a bearing;
wherein the ball has a recess, the rotation pin is disposed within the recess, the bearing is disposed about the rotation pin within the recess, and the rotation pin is non-rotatably coupled to the arm of the cradle.

18. The ball valve assembly of claim 17, wherein a portion of the arm covers the bearing within the recess.

* * * * *